United States Patent
Mirhosseini

(10) Patent No.: US 12,217,371 B1
(45) Date of Patent: Feb. 4, 2025

(54) SELECTIVE DEPTH ANALYSIS

(71) Applicant: Seyedkoosha Mirhosseini, Santa Clara, CA (US)

(72) Inventor: Seyedkoosha Mirhosseini, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 156 days.

(21) Appl. No.: 17/933,959

(22) Filed: Sep. 21, 2022

Related U.S. Application Data

(60) Provisional application No. 63/261,605, filed on Sep. 24, 2021.

(51) Int. Cl.
 *G06T 19/00* (2011.01)
 *G06T 7/50* (2017.01)
 *G06T 11/00* (2006.01)

(52) U.S. Cl.
 CPC .............. *G06T 19/006* (2013.01); *G06T 7/50* (2017.01); *G06T 11/001* (2013.01)

(58) Field of Classification Search
 None
 See application file for complete search history.

(56) References Cited

U.S. PATENT DOCUMENTS

| | | | |
|---|---|---|---|
| 9,984,433 B2 * | 5/2018 | Han | G06T 5/20 |
| 2009/0174657 A1 * | 7/2009 | Miyazaki | G06F 3/01 |
| | | | 345/158 |
| 2019/0116352 A1 * | 4/2019 | Pesonen | H04N 19/132 |

* cited by examiner

*Primary Examiner* — Tapas Mazumder
(74) *Attorney, Agent, or Firm* — Blank Rome LLP

(57) ABSTRACT

Techniques are disclosed, whereby graphical information for a first image frame to be rendered is obtained at a first device, the graphical information comprising at least depth information for at least a portion of the pixels within the first image frame. Next, a regional depth value may be determined for a region of pixels in the first image frame. Next, the region of pixels may be coded as either a "skipped" region or a "non-skipped" region based, at least in part, on the determined regional depth value for the region of pixels. Finally, if the region of pixels is coded as a non-skipped region, a representation of the region of pixels may be rendered and composited with any other graphical content, as desired, to a display of the first device; whereas, if the region of pixels is coded as a skipped region, the first device may avoid rendering the region.

20 Claims, 8 Drawing Sheets

SELECTIVE DEPTH ANALYSIS

BACKGROUND

This disclosure relates generally to image processing. More particularly, but not by way of limitation, this disclosure relates to techniques and systems for providing tools to enhance efficiency and performance when rendering graphical content in an extended reality (XR) environment.

Some electronic devices are capable of generating and presenting XR environments. An XR environment may include a wholly- or partially-simulated environment, including one or more virtual objects, which users of such electronic device can sense and/or interact with. In XR, a subset of a person's physical motions, or representations thereof, may be tracked, and, in response, one or more characteristics of the one or more virtual objects simulated in the XR environment may be adjusted in a manner that comports with at least one law of physics.

DETAILED DESCRIPTION

Figure 1A:
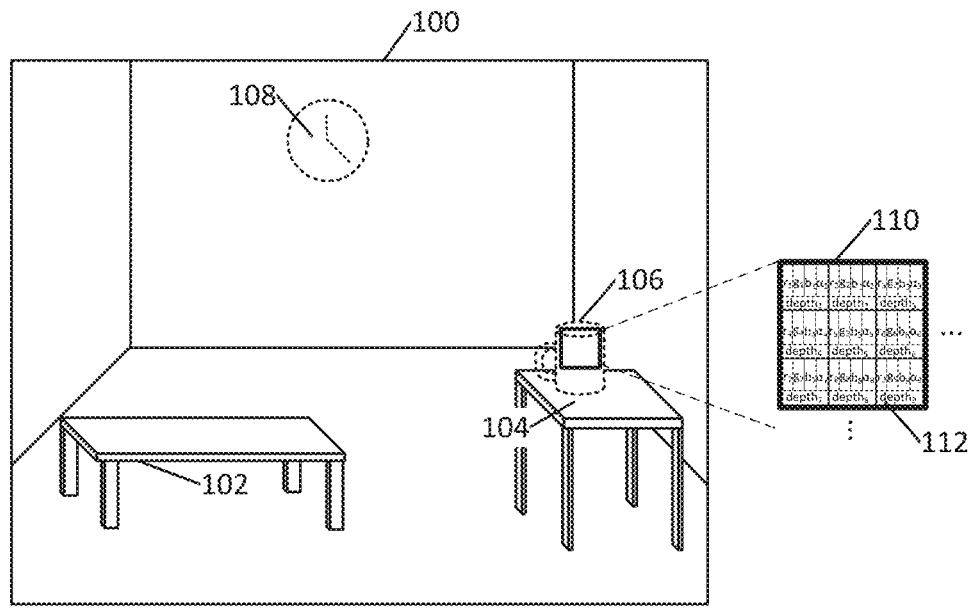
FIG. 1A shows a diagram of an example extended reality (XR) operating environment, according to one or more embodiments.

This disclosure pertains to systems, methods, and computer readable media to provide enhancements for rendering and presenting graphical information in extended reality (XR) environments. Some XR environments may be filled (or almost filled) with virtual objects or other simulated content (e.g., in the case of pure virtual reality (VR) environments). However, in other XR environments (e.g., in the case of augmented reality (AR) environments, and especially those wherein the user has a wide field of view (FOV), such as a horizontal FOV of 70 degrees or greater), there may be large portions of the user's FOV that have no virtual objects or other simulated content in them at certain times. In other cases, the virtual objects (and/or other simulated content) in an XR environment may be located at such large scene depths that it does not need to be rendered by the electronic device, as it would not take up a noticeable or perceptible portion of the user of the electronic device's FOV. Thus, what is needed are improved techniques for rendering graphical content in an XR environment that provide for improved efficiency by performing an evaluation of depth information associated with such graphical content before it is selectively rendered by an electronic device that is presenting the XR environment.

In some embodiments, the techniques described herein provide a method for selective graphical rendering that increases efficiency by leveraging depth information associated with certain graphical content that is to be rendered in the XR environment. In some embodiments, depth information for a given pixel that is to be rendered in an XR environment may comprise one or more of: a direct value representative of the depth within the scene of the given pixel (e.g., "30 centimeters"), a range of depths within the scene (e.g., between 5 and 5.2 meters), a depth relative to another object in a scene (e.g., the same depth as a particular wall in a scene), etc. In other words, any desired form of information from which a depth of a pixel of graphical content to be rendered may be estimated, measured, determined, or inferred may be referred to herein as "depth information" for a given pixel.

In one or more embodiments, the method may comprise: obtaining, at a first device, graphical information for a first image frame to be rendered, wherein the graphical information comprises at least depth information for at least a portion of pixels within the first image frame; determining a regional depth value for a region of pixels in the first image frame based, at least in part, on the depth information for the pixels within the region of pixels; coding the region of pixels as either a skipped region or a non-skipped region based, at least in part, on the determined regional depth value for the region of pixels; if the region of pixels is coded as a non-skipped region, rendering a representation of the region of pixels to a display; and if the region of pixels is coded as a skipped region, avoid rendering a representation of the region of pixels to the display.

In some embodiments, the method may further comprise dividing the portion of pixels within the first image frame into a first plurality of regions of pixels, and then determining a regional depth value for each individual region of pixels in the first plurality of regions of pixels, and coding each individual region of the first plurality of regions of pixels as either a skipped region or a non-skipped region based, at least in part, on the determined regional depth value for the respective region of pixels. Similarly, in such embodiments, each of the non-skipped regions of the first plurality of regions may be rendered, while rendering may be avoided for each of the skipped regions of the first plurality of regions. As may be understood, when a large percentage of the regions making up an image frame may be coded as skipped regions, substantial efficiencies may be gained by avoiding the rendering process on the graphical information located in such skipped regions.

In some embodiments, the graphical information may further comprise color information, e.g., red-green-blue-alpha (RGBA) pixel information. In some such embodiments, the coding of each region of the first plurality of regions of pixels as either a skipped region or a non-skipped region may be further based, at least in part, on a determination of whether the color information for any of the pixels within a respective region contains a non-default value (e.g., a value other than a zeroed-out value for each color and/or alpha channel may be considered a "non-default" value, in some implementations).

In other embodiments, determining a regional depth value for a region of pixels may comprise determining at least one of: a maximum depth of a pixel within the region; a minimum depth of a pixel within the region; or an average depth for the pixels within the region.

In still other embodiments, determining a regional depth value a respective region of pixels further comprises: setting the regional depth value for the respective region to a value of '0' if all pixels within the respective region have depth information indicative of a depth greater than or equal to a predetermined depth rendering threshold; and setting the regional depth value for the respective region to a value of '1' if any pixels within the respective region have depth information indicative of a depth less than the predetermined depth rendering threshold. In such embodiments, regions may be then be coded as a "skipped region" if the respective region has a regional depth value of '0' and may be coded as a "non-skipped region" if the respective region has a regional depth value of '1'.

As mentioned above, the techniques disclosed herein may increase efficiency in terms of processing power and/or time required to render graphical content, e.g., in an XR environment, by avoiding rendering representations of any of the regions of pixels in a given image frame that do not possess "valid" depth information (e.g., only rendering regions of pixels having at least one pixel with a depth that is less than a predetermined depth rendering threshold).

In a first implementation, the efficiencies described herein may be achieved by dispatching (e.g., from a graphics processing unit (GPU)) an individual compute thread for each region of the first plurality of regions (wherein, e.g., the first plurality of regions may comprise a two-dimensional grid of regularly- or irregularly-spaced regions distributed across the extent of the FOV of the first image frame) in parallel to perform the steps of: determining a regional depth value for a respective region of the first plurality of regions of pixels; and coding the respective region of the first plurality of regions of pixels as either a skipped region or a non-skipped region based, at least in part, on the determined regional depth value for the respective region. As described above, efficiencies may then be gained by only rendering the graphical information located in regions coded as non-skipped regions.

In a second implementation, efficiencies described herein may be achieved by dispatching (e.g., from a GPU) a first plurality of groups of fragment threads to render the graphical information for the first image frame; and then, for each group in the first plurality of groups of fragment threads dispatched to render the graphical information for the first image frame, performing the following operations: determining an affected region of the pixels within the first image frame to which the respective group of fragment threads is rendering; determining a regional depth value for the affected region; coding the affected region as either a skipped region or a non-skipped region based, at least in part, on the determined regional depth value for the affected region; if the affected region of pixels is coded as a non-skipped region, rendering a representation of the affected region to a display; and if the affected region of pixels is coded as a skipped region, avoid rendering a representation of the affected region to the display.

Exemplary Extended Reality (XR) Devices

A person can interact with and/or sense a physical environment or physical world without the aid of an electronic device. A physical environment can include physical features, such as a physical object or surface. An example of a physical environment is a physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly- or partially-simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, wearable device, or the like) and adjust graphical content and/or auditory content presented to the user—e.g., similarly to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples includes: heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment.

A head mountable system may also have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies, can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

For purposes of this disclosure, a multiuser communication session can include an XR environment in which two or more devices are participating, while a single user session refers to an XR environment in which only one device is participating.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming—but would nevertheless be a routine undertaking for those of ordinary skill in the design and implementation of graphics rendering systems, having the benefit of this disclosure.

Exemplary XR Operating Environments

FIG. 1A shows a diagram of an example extended reality (XR) operating environment, according to one or more embodiments. While pertinent features are shown, those of ordinary skill in the art will appreciate, from the present disclosure, that various other features have not been illustrated for the sake of brevity- and so as not to obscure more pertinent aspects of the example among the implementations disclosed herein. To that end, as a nonlimiting example, the operating environment 100 includes a first physical environment, whereas other operating environments could include a completely different physical environment.

As shown in FIG. 1A, the first environment 100 includes different types of physical objects. As described above, the first environment 100 may be projected onto a display of one or more XR-enabled systems. In one or more embodiments, the display of the XR-enabled system may be a passthrough display (i.e., an opaque display, which reproduces some or all of the physical objects in the device's environment, e.g., by capturing them with outward-facing cameras), and a view of physical tables 102 and 104 in the first environment 100 may simply be reproduced at the appropriate place on the display.

In other embodiments, "virtual" versions of physical tables 102 and 104 may be rendered at the appropriate place on the display, e.g., allowing a user adjust the appearance of such virtual objects by experimenting with what different materials, colors, sizes, etc. of the physical tables in the room may look like.

In still other embodiments, the first environment 100 may further include different types of purely virtual objects, e.g., objects that are not actually physically present in the environment. In the first environment 100, virtual coffee mug 106 and virtual wall clock 108 represent examples of purely virtual objects in the first environment (as further indicated by the use of dashed lines for the edges of virtual coffee mug 106 and virtual wall clock 108). As depicted, virtual coffee mug 106 is interacting with physical table 104 (i.e., it has been "placed on" physical table 104 in the displayed version of the first environment 100), while virtual wall clock 108 has been placed against a back or "far" wall of the first environment 100.

Turning back to FIG. 1A, graphical information 110 for an exemplary portion of pixels of the graphical information being rendered in first environment 100 are shown in greater detail. For example, graphical information 110 comprises an exemplary 3×3 grid of pixels. It is to be understood that the nine depicted pixels in graphical information 110 are merely exemplary of the many pixels that may comprise the graphical information. As depicted, the graphical information may comprise color information, e.g., red-green-blue-alpha (RGBA) color information for each pixel, as well as depth information 112 for each pixel. As will be discussed herein, in some embodiments, the depth information 112 of pixels within a given region of pixels in the graphical information being rendered may be used by the electronic device to determine whether or not a representation of the given region of pixels will be rendered to a display of the electronic device. In other embodiments, the color information may additionally (or alternatively) be used in the determination of whether or not to render a representation of the given region of pixels.

According to some embodiments, the depth for a given pixel in the first environment may be given with respect to a viewer of the environment (e.g., in the case of a user with wearable device displaying an XR operating environment). In other embodiments, the depth of particular pixels represented in the graphical information may simply be measured from the point of view that the first environment is being displayed (e.g., in the case of an XR operating environment that is being rendered from some other specified point of view that is not linked to the position or eyeline of a particular user/wearer of the device). For example, if the virtual coffee mug 106 is currently placed on the physical table 104, which is 5-6 meters away from a viewer of the displayed version of first environment 100, then the portion of the pixels making up the graphical information 110 corresponding to virtual coffee mug 106 may likewise have depth information 112 indicating pixel depths of between 5 and 6 meters. In the example of first environment 100, then, the pixels making up the graphical information for displaying virtual wall clock 108 may have depth information indicating significantly larger depths (e.g., depths of 10-12 meters away from the viewer of the displayed version of first environment 100) than the pixels making up the graphical information 110 corresponding to virtual coffee mug 106. In some implementations, there may be a predetermined depth rendering threshold value (e.g., 10 meters) established, wherein all graphical information content (e.g., a region of pixels) having pixels with depths greater than or equal to the predetermined depth rendering threshold value may cause the device rendering the XR environment to determine an overall depth value representative of the pixels within the region (also referred to herein as a "regional depth value") to be a constant value (e.g., infinity, "far plane", "invalid," '0,' etc.), which the device may use as an indication that the respective graphical information content (e.g., the corresponding region of pixels) does not need to be rendered for the current image frame.

According to still other embodiments, a camera having a wide angle lens (e.g., a fisheye lens) may be used to capture the images of the physical environment in which an XR-enabled system is operating. In such cases, the wide angle lens may capture (or be capable of capturing) areas of the physical scene extending beyond the extent that the camera's image sensor is currently capable of capturing image signal for and/or extending beyond the portion of the physical scene represented in the image(s) currently being displayed to a user of the XR-enabled system. To the extent that regions of pixels corresponding such areas of the physical scene are represented in a frame buffer for a first image frame to be rendered by the XR-enabled system, the regional depth values for graphical information content located in such regions may also be set to invalid regional depth values (e.g., "0" or "infinity"), so that such regions may also be coded as 'skipped' regions.

Figure 1B:
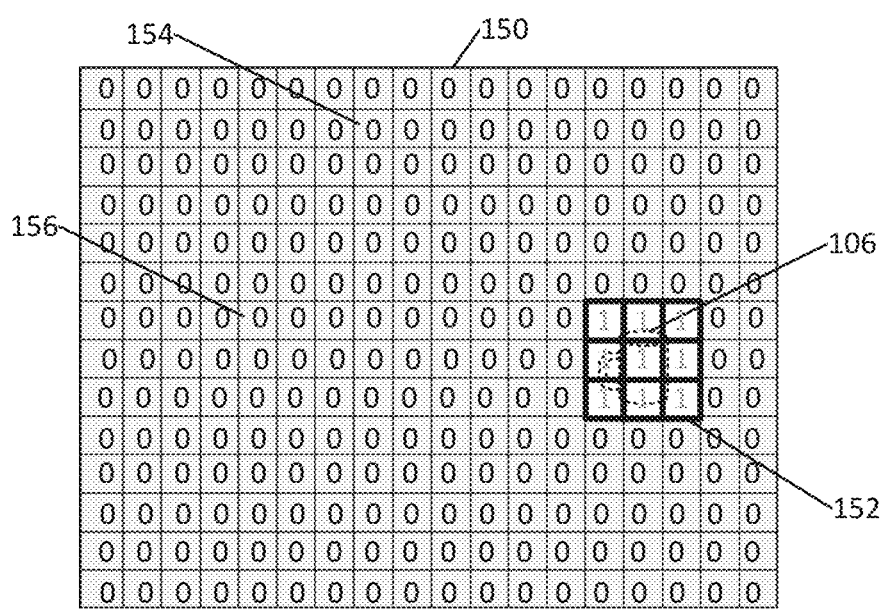
FIG. 1B shows exemplary coded regions corresponding to graphical information for an image frame to be rendered for an XR operating environment, according to one or more embodiments.

FIG. 1B shows exemplary coded regions 154 corresponding to graphical information for an image frame 150 to be rendered for an XR operating environment, according to one or more embodiments. As illustrated, according to some embodiments, individual regions 154 may comprise sub-portions of the pixels in the current image frame 150 being rendered, e.g., 16 by 16 pixel tiles, 32 by 32 pixel tiles, 64 by 64 pixel tiles, etc. In some embodiments, a regional depth value may be determined for each region of pixels 154 in the current image frame 150 being rendered, and then, each region 154 of pixels may be coded as either a "skipped" region or a "non-skipped" region based, at least in part, on the determined regional depth value for the respective region of pixels. For example, the regional depth value for a respective region may be set to a value of '0' if all pixels within the respective region have depth information indicative of a depth greater than or equal to a predetermined depth rendering threshold, and the regional depth value for a respective region may be set to a value of '1' if any pixels within the respective region have depth information indicative of a depth less than the predetermined depth rendering threshold. As may now be understood, in such implementations, regions may be coded as a skipped region if it has been assigned a regional depth value of '0' and may be coded as a non-skipped region if it has been assigned a regional depth value of '1.' By avoiding the rendering of all regions coded as skipped regions within the image frame, significant efficiencies may be gained-especially in image frames wherein the graphical information content to be rendered with "valid" (e.g., non '0'-valued) regional depth values takes up a relatively small portion of the overall FOV of the image frame being rendered.

Returning to the example image frame 150 depicted in FIG. 1B, it may be seen that region 154 (and neighboring regions) corresponds to the position of virtual wall clock 108, which, in this example, has depth information indicative of a depth greater than or equal to a predetermined depth rendering threshold (e.g., 10 meters), and thus the regional depth value for the region has been set to '0,' allowing the device rendering the XR operating environment to avoid the rendering of region 154 (and other regions in image frame 150 similarly coded as having a regional depth value '0'). To be clear, even though the pixels associated with virtual wall clock 108 may have "valid" or "non-default" color information values, e.g., colors specifying the color of the clock, the hands on the clock, the numbers on the clock, the border of the clock, etc., the regions have still been coded as skipped regions for the rendering process in this example, due to their depth information indicating that the clock is so far away from the user's point of view of the virtual environment 100, it is not necessary to render the corresponding regions of pixels. Similarly, other regions, e.g., exemplary region 156, may contain no virtual content at all, and thus, based on having no valid depth information (or color information, in this example), such regions containing no virtual content may also be assigned a regional depth value of '0,' allowing the device rendering the XR operating environment to also avoid rendering these regions of the image frame 150.

By contrast, the nine regions within sub-portion 152 (corresponding to the location of virtual coffee mug 106 in the virtual environment 100) in the example image frame 150 depicted in FIG. 1B, have been determined to have depth information indicative of a depth less than the predetermined depth rendering threshold (e.g., 10 meters), and thus the regional depth values for the regions within sub-portion 152 have been set to '1,' indicating to the device rendering the XR operating environment that it only needs to render virtual graphical content for the nine regions within sub-portion 152 of image frame 150. (Note: In this example, there are no other regions in image frame 150 similarly coded as having a regional depth value '1,' although there certainly could be in other exemplary scenes.) It may now be appreciated that, by utilizing the selective depth analysis and rendering techniques described herein, the device rendering the XR operating environment will only have to render the nine regions within sub-portion 152 out of the 252 total regions shown in example image frame 150, or a reduction in rendering requirements of approximately 96%.

Importantly, according to some embodiments, by utilizing only the depth information values for the pixels in each region, which typically have a lower bit depth (e.g., 8-bit depth values), to make the region coding determinations, i.e., rather than the color information values for the pixels in each region, which may typically comprises three or more channels (e.g., red, green, blue, and/or an alpha channel), each have higher bit depths than the depth information channel (e.g., 10-bit color values, 16-bit color values, etc.), additional processing savings may be realized. Additionally, depth information typically changes more slowly across the surface of a virtual object than color information, thereby allowing depth information to also be compressed or sub-sampled more aggressively than color information, without the risk of losing relevant detail or quality. In some embodiments, however, once the regions with valid regional depth values have been identified, a subsequent check of such regions' color information may also be made, e.g., to see if any such regions possess only 'default' or 'non-dirty' color values, i.e., color values that have not been modified from the initial (e.g., non-visible or all-zeroes) states, as such regions may also be excluded from the rendering process. For example, if a region had pixels with valid depth information, but all the pixels in such a region were set to be fully transparent, then there would be no need to spend any additional graphical rendering resources on such regions, since they would not have any visual impact on the final image viewed by a user.

Figure 2A:
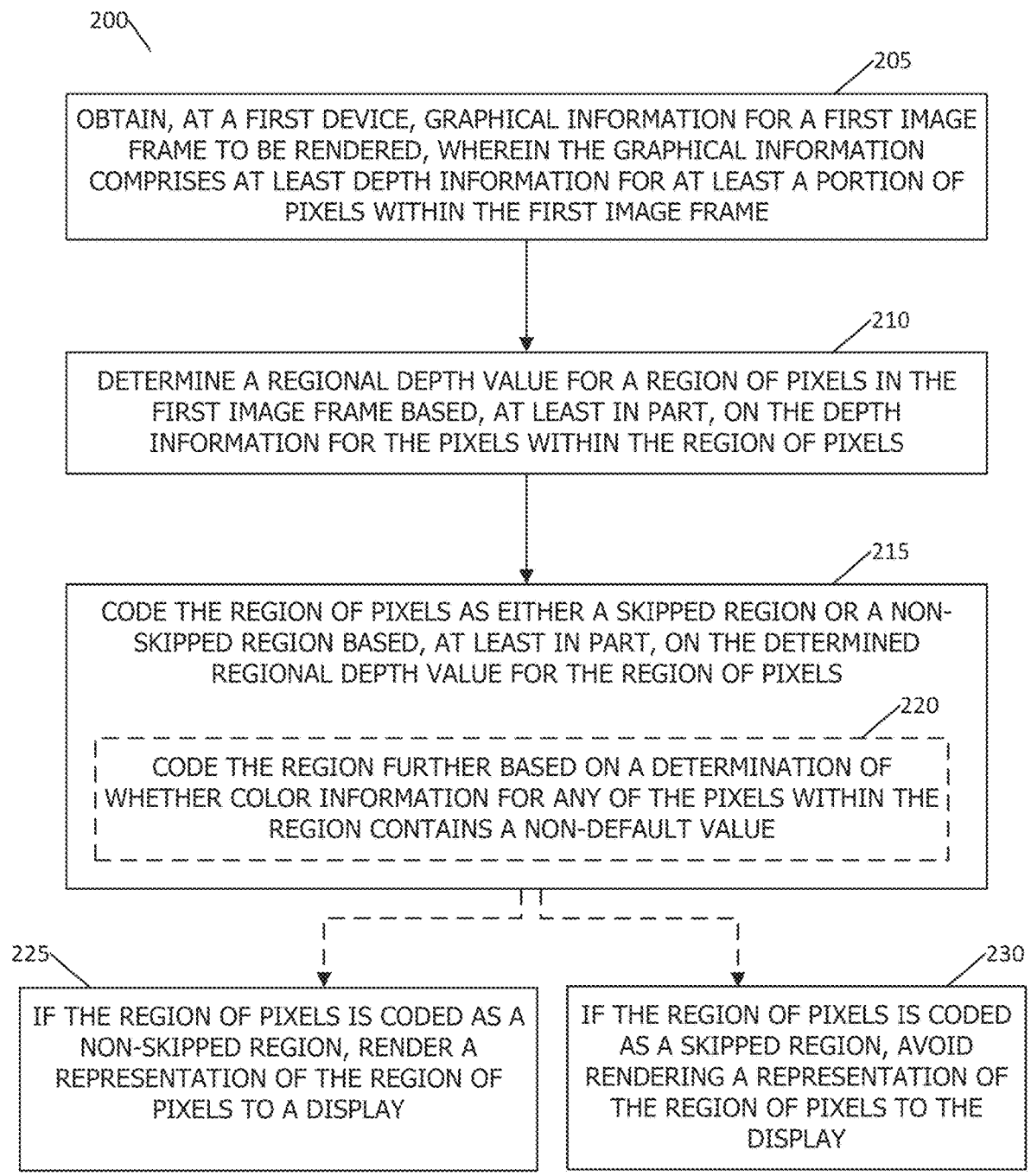
FIGS. 2A-2D show flowcharts of techniques for selective graphical rendering based on depth information analysis, according to one or more embodiments.

FIG. 2A depicts a flowchart 200 of a technique for selective graphical rendering based on depth information analysis, according to one or more embodiments. For purposes of explanation, the flowchart may be described referencing example elements from FIGS. 1A and 1B. Although the flowchart shows various procedures performed by particular components in a particular order, it should be understood that according to one or more embodiments, the various processes may be performed by alternative devices or modules. In addition, the various processes may be performed in an alternative order, and various combinations of the processes may be performed simultaneously. Further, according to some embodiments, one or more of the processes may be omitted, or others may be added.

The flowchart 200 begins at block 205, where graphical information is obtained, at a first device, for a first image frame to be rendered, wherein the graphical information comprises at least depth information for at least a portion of pixels within the first image frame. The flowchart 200 continues at block 210, wherein a regional depth value is determined for a region of pixels in the first image frame, e.g., based, at least in part, on the depth information for the pixels within the region of pixels. At block 215, the region of pixels may be coded as either a skipped region or a non-skipped region based, at least in part, on the determined regional depth value for the region of pixels. In some implementations, at block 220, the coding of the region may additionally be based on a determination of whether color information for any of the pixels within the region contains a non-default value. As described above, a default value for each channel of a pixel's color information, may indicate that the pixel has not been made 'dirty' from its default color state, i.e., there is no graphical content for the current image frame that is waiting to be rendered at the location of the particular pixel. Thus, block 220 may be used as a secondary factor to determine whether or not the rendering for a given region can be skipped, e.g., even if the region appears to have pixels with valid depth information, thereby leading to yet further efficiency gains. In still other embodiments, at block 215, the region of pixels may be coded as a skipped region when all pixels in region otherwise do not need to be rendered for the first image frame. For example, in some instances, pixels captured by a lens of a camera may be outside the extent of what the camera's image sensor is able to obtain image signal information for and/or outside the extent of the FOV of the scene being rendered to the user of the XR-enabled system. In such instances, a region may be coded as a skipped region, even if the estimated depth of one or more pixels of graphical information in the region are otherwise estimated to have valid depth information. Based on the region coding determinations made at block 215, the flowchart 200 may then take one of two actions for each region in the first image frame: if the region of pixels is coded as a non-skipped region, render a representation of the region of pixels to a display (block 225); and if the region of pixels is coded as a skipped region, avoid rendering a representation of the region of pixels to the display (block 230).

Figure 2B:
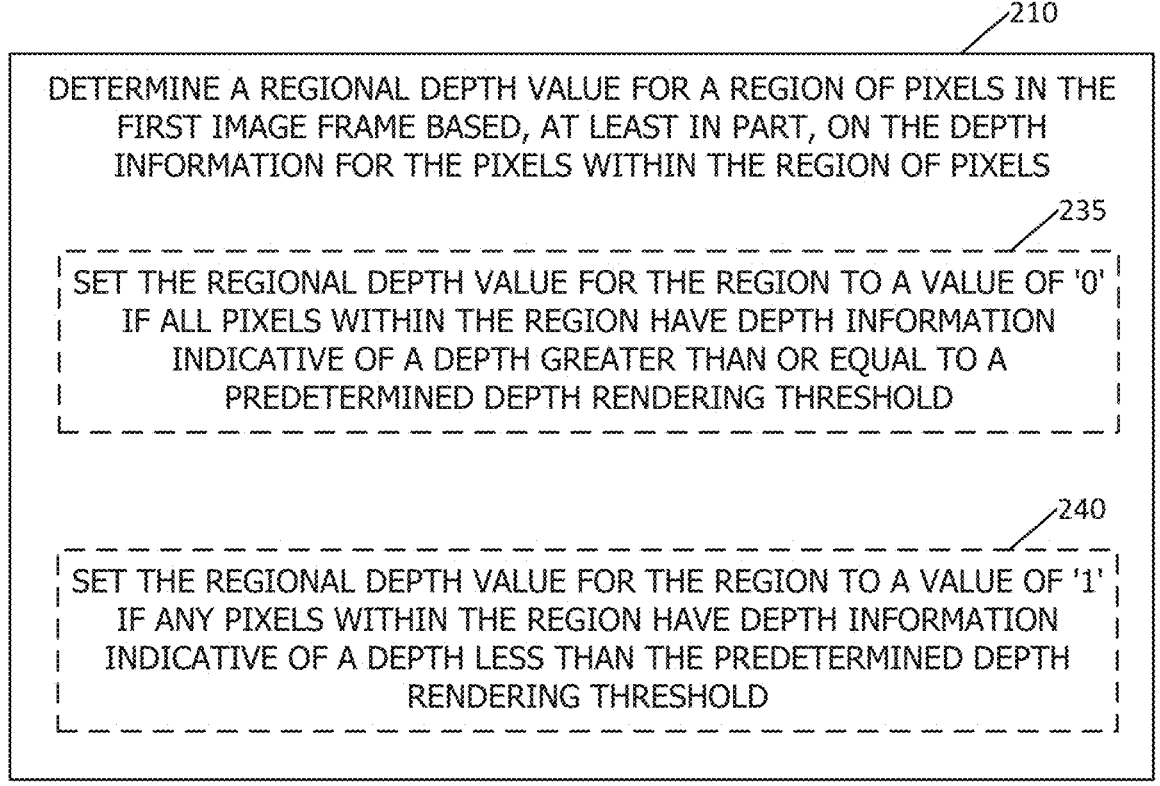

FIG. 2B depicts a flowchart containing additional details regarding block 210 of flowchart 200. Block 235, recites a particular implementation of block 210, wherein the regional depth value for the region is set to a value of '0' if all pixels within the region have depth information indicative of a depth greater than or equal to a predetermined depth rendering threshold. Likewise, block 240, recites a particular implementation of block 210, wherein the regional depth value for the region is set to a value of '1' if any pixels within the region have depth information indicative of a depth less than the predetermined depth rendering threshold.

Figure 2C:
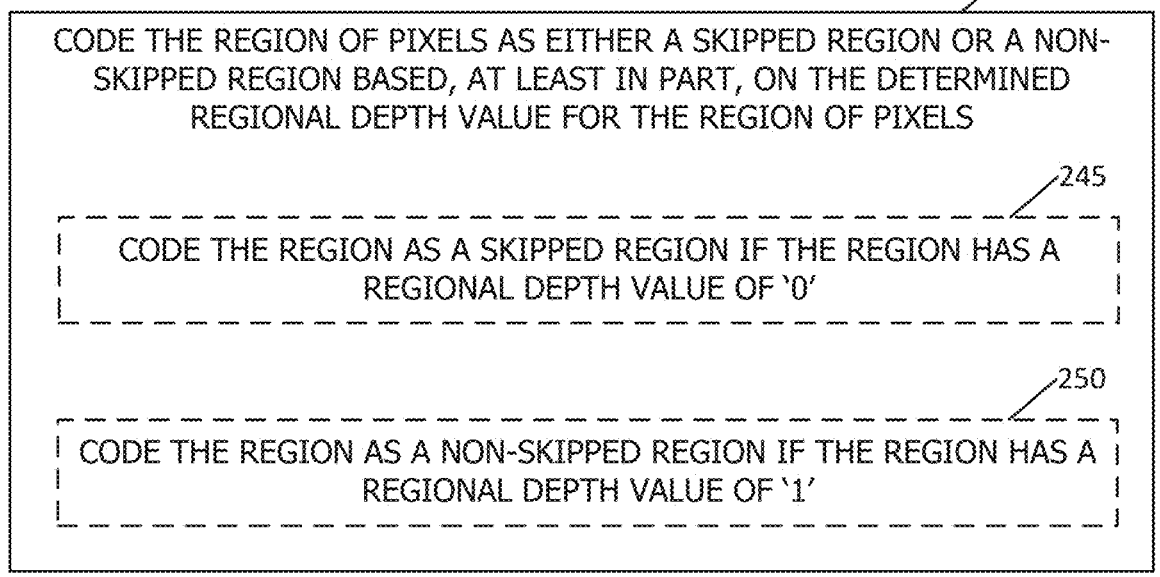

FIG. 2C depicts a flowchart containing additional details regarding block 215 of flowchart 200. Block 245, recites a particular implementation of block 215, wherein the region is coded as a skipped region if the region has a regional depth value of '0.' Likewise, block 250, recites a particular implementation of block 215, wherein the region is coded as a non-skipped region if the region has a regional depth value of '1.' The use of simplified/smaller regional depth values (e.g., a binary regional depth value of '0' or '1') may further increase the efficiency of the overall rendering process (e.g., as opposed to using and evaluating 8-bit regional depth values, or the like), thereby allowing the device to more easily discern and/or discard the regions of pixels that have been coded as skipped regions.

Figure 2D:
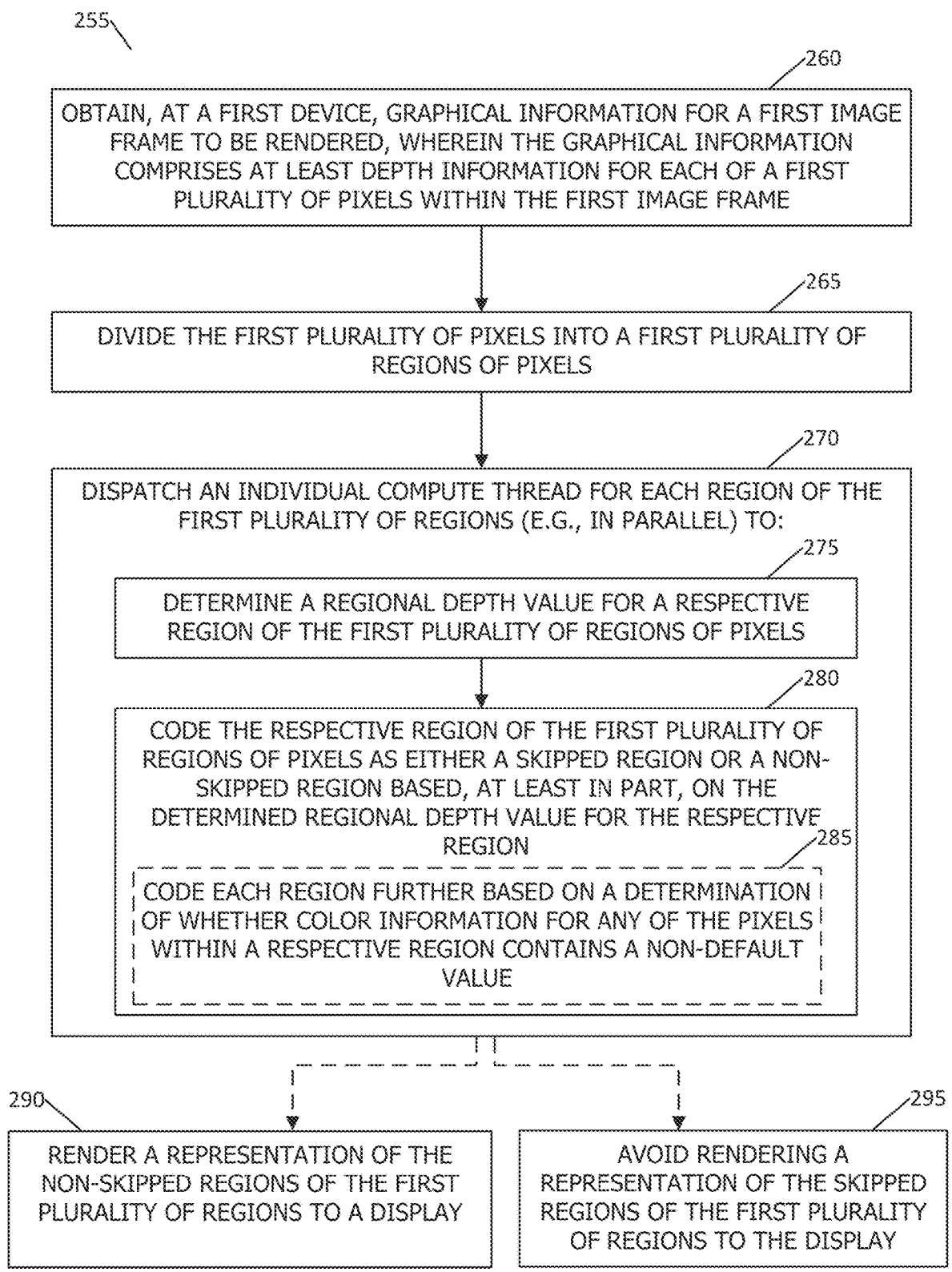

FIG. 2D depicts a flowchart 255 of another technique for selective graphical rendering based on depth information analysis, according to one or more embodiments. The flowchart 255 begins at block 260, where graphical information is obtained, at a first device, for a first image frame to be rendered, wherein the graphical information comprises at least depth information for each of a first plurality of pixels within the first image frame. The flowchart 255 continues at block 265, wherein the first plurality of pixels may be divided into a first plurality of regions of pixels (e.g., such as the regions 154/156 discussed above with reference to FIG. 1B). At block 270, the flowchart may dispatch an individual compute thread for each region of the first plurality of regions (e.g., in parallel) to determine whether or not each individual region needs to be rendered. As discussed above with reference to FIG. 2A, each individual thread (which, in the example of the flowchart 255 of FIG. 2D, has been assigned to an individual region in the first image frame) may: determine a regional depth value for a respective region of the first plurality of regions of pixels, e.g., based, at least in part, on the depth information for the pixels within the respective region of pixels (block 275); and code the respective region of the first plurality of regions of pixels as either a skipped region or a non-skipped region based, at least in part, on the determined regional depth value for the respective region (block 280). In some implementations, the coding of each respective region may additionally be based on a determination of whether color information for any of the pixels within a respective region contains a non-default value (block 285).

As may now be understood, if the first image frame is divided into a two-dimensional grid of smaller individual regions covering the entire extent of the first image frame, then the techniques described in flowchart 255 may provide an orderly and efficient method of logically checking the depth information for the entire extent of the first image frame and only actually rendering the content from the regions that have valid pixel depth information. Moreover, by performing this depth information processing operation on a region-by-region basis, the device does not have to keep as large of a number of global operations in memory, which would also be more costly from a memory management standpoint.

Figure 3:
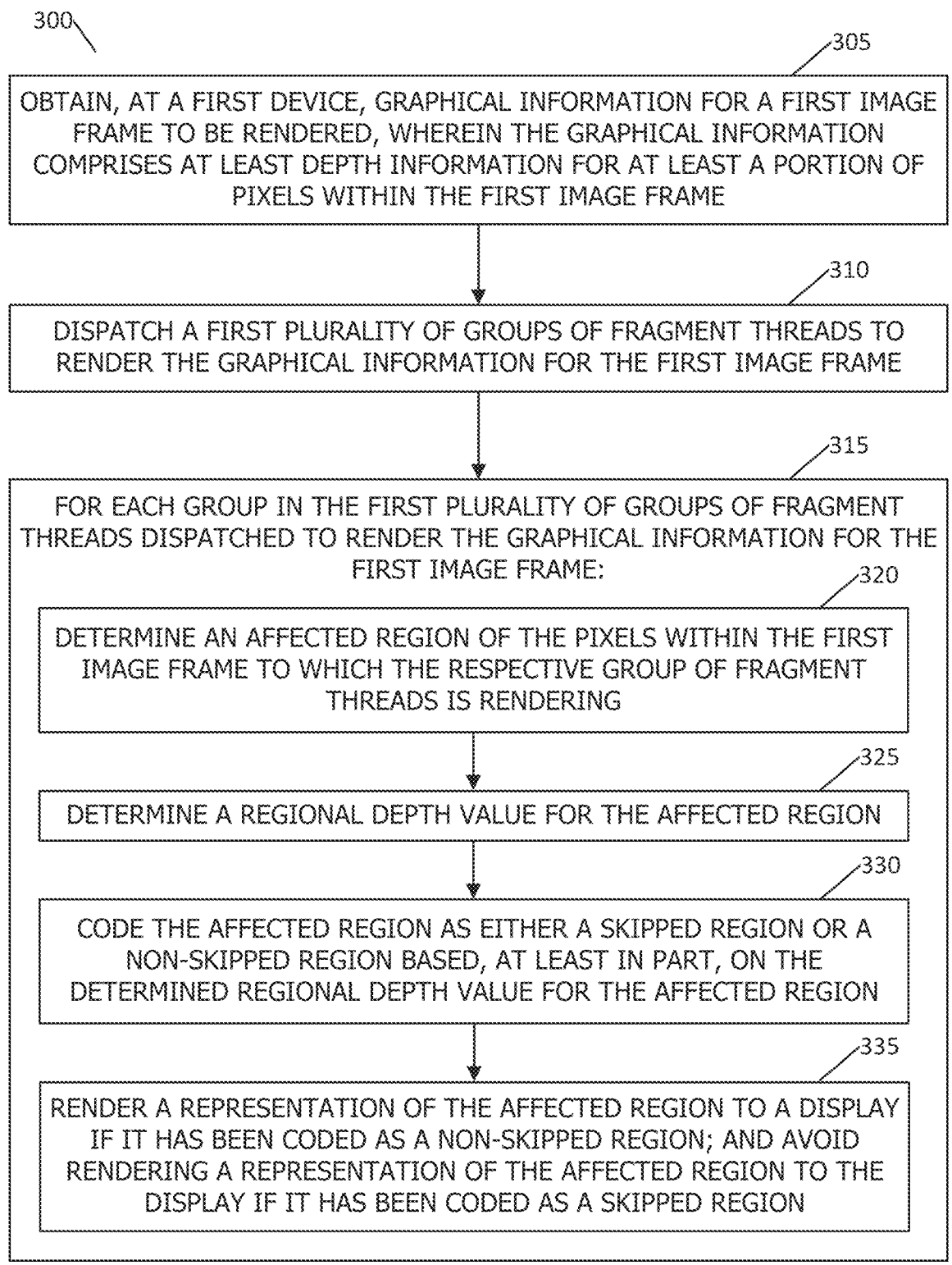
FIG. 3 shows a flowchart of another technique for selective graphical rendering based on depth information analysis, according to one or more embodiments.

FIG. 3 depicts a flowchart 300 of yet another technique for selective graphical rendering based on depth information analysis, according to one or more embodiments. As compared with the techniques described above in FIG. 2D, which intentionally launches multiple compute threads at predetermined locations across the extent of the first image frame, the techniques described in FIG. 3 rely upon the order and sequencing of the processing hardware's launching of different groups of fragment threads to render the graphical information to a display of the device, checking each affected region of pixels in the image frame for the presence of valid depth data before it is rendered and composited with any other content for display.

The flowchart 300 begins at block 305, wherein graphical information for a first image frame to be rendered is obtained at a first device, and wherein the graphical information comprises at least depth information for at least a portion of pixels within the first image frame. The flowchart 300 continues at block 310, where a first plurality of groups of fragment threads are dispatched by the XR-enabled electronic device to render the graphical information for the first image frame to a display of the device. At block 315, additional processing is performed for each group in the first plurality of groups of fragment threads that dispatched to render the graphical information for the first image frame, including: determining an affected region of the pixels within the first image frame to which the respective group of fragment threads is rendering (block 320); determining a regional depth value for the affected region, e.g., based, at least in part, on the depth information for the pixels within the affected region of pixels (block 325); coding the affected region as either a skipped region or a non-skipped region based, at least in part, on the determined regional depth value for the affected region (block 330); and, finally, rendering a representation of the affected region to a display if it has been coded as a non-skipped region and avoiding rendering a representation of the affected region to the display if it has been coded as a skipped region (block 335). As described above, in some embodiments, the coding of the affected region based on the determined regional depth value may comprise determining whether any or all pixels being rendered in the affected region have 'valid' depth information. If the pixels in the affected region have valid depth information, the region may be coded as a non-skipped region, and the process may proceed to render the graphical information and composite it with any other visual information being rendered to the device's display. In some embodiments in accordance with FIG. 3, the threads that are launched by the processing hardware are constrained using a stencil buffer, such that threads are only dispatched for the fragments the application actually will render. As such, other areas of the display do not need to be coded or processed using relevant depth information.

In some embodiments, the determination of the affected region for a given group of fragment threads may comprise determining a thread ID for one or more of the threads in the given group of fragment threads. Then, by analyzing the determined thread IDs (e.g., via determining the maximum thread ID in the group, the minimum thread ID in the group, etc.), a determination may be made as to which thread within the given group of fragment threads was most recently active. Then, if the most recently-active thread comprises graphical information possessing valid depth information, the affected region may be coded as a non-skipped region, and thus proceed to be rendered. In some implementations, if a group of threads is dispatched over the same time interval, it is known that all threads in the group are rendering to a common region, so, if it can be determined that the region is a non-skipped region from any of the threads in the region, it is safe to render all threads in the group of threads to the affected region. In this way, a region can be identified as 'dirty' (i.e., needing rendering), and each of the threads in the group can be run concurrently (i.e., "racing" with each other), without the need to impose any concurrency tracking on the rendering hardware.

Exemplary Block Diagram

Figure 4:
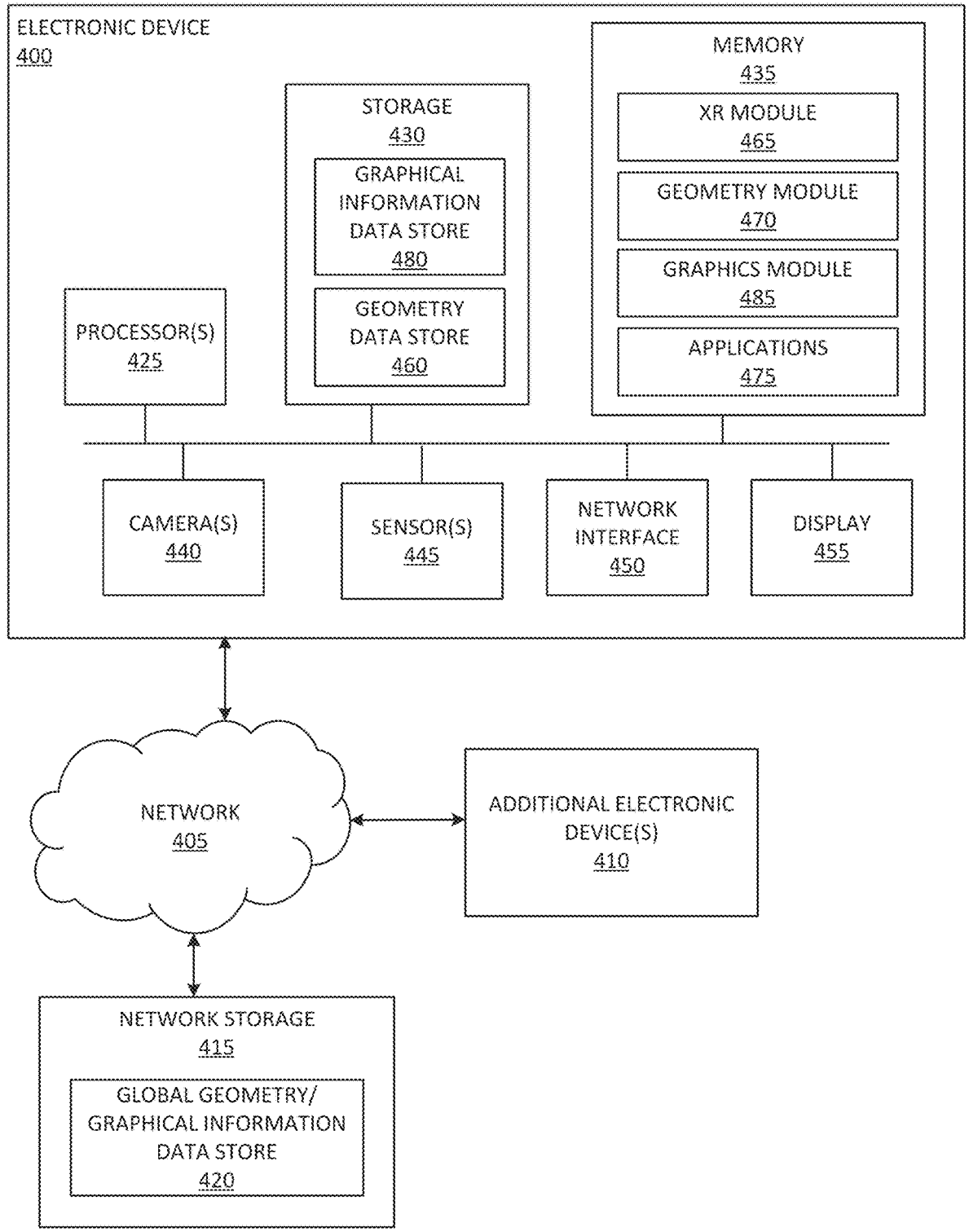
FIG. 4 shows, in block diagram form, a simplified system diagram according to one or more embodiments.

Referring now to FIG. 4, a simplified block diagram of an electronic device 400 is depicted, communicably connected to additional electronic devices 410 and a network storage 415 over a network 405, in accordance with one or more embodiments of the disclosure. Electronic device 400 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 400, additional electronic device 410, and/or network storage 415 may additionally, or alternatively, include one or more additional devices within which the various functionality may be contained, or across which the various functionality may be distributed, such as server devices, base stations, accessory devices, and the like. Illustrative networks, such as network 405 include, but are not limited to, a local network such as a universal serial bus (USB) network, an organization's local area network, and a wide area network such as the Internet. According to one or more embodiments, electronic device 400 is utilized to participate in a single user or multiuser communication session in an XR environment. It should be understood that the various components and functionality within electronic device 400, additional electronic device 410 and network storage 415 may be differently distributed across the devices, or they may be distributed across additional devices.

Electronic Device 400 may include one or more processors 425, such as a central processing unit (CPU). Processor(s) 425 may include a system-on-chip such as those found in mobile devices and include one or more dedicated graphics processing units (GPUs). Further, processor(s) 425 may include multiple processors of the same or different type. Electronic device 400 may also include a memory 435. Memory 435 may include one or more different types of memory, which may be used for performing device functions in conjunction with processor(s) 425. For example, memory 435 may include cache, ROM, RAM, or any kind of transitory or non-transitory computer readable storage medium capable of storing computer readable code. Memory 435 may store various programming modules for execution by processor(s) 425, including XR module 465, geometry module 470, graphics module 485, and other various applications 475. Electronic device 400 may also include storage 430. Storage 430 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Electronic device may additionally include a network interface 450, from which the electronic device 400 can communicate across network 405.

Electronic device 400 may also include one or more cameras 440 or other sensors 445, such as depth sensor(s), from which depth or other characteristics of an environment may be determined. In one or more embodiments, each of the one or more cameras 440 may be a traditional RGB camera, or a depth camera. Further, cameras 440 may include a stereo- or other multi-camera system, a time-of-flight camera system, or the like. Electronic device 400 may also include a display 455. The display device 455 may utilize digital light projection, OLEDs, LEDs, ULEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Storage 430 may be utilized to store various data and structures which may be utilized for providing state information in order to manage geometry data for physical environments of a local user and/or a remote user. Storage 430 may include, for example, geometry data store 460. Geometry data store 460 may be utilized to store data related to one or more physical environments in which electronic device 400 participates, e.g., in a single user session or a multiuser communication session. For example, geometry data store 460 may store characteristics of a physical environment, which may affect available space for presentation of components during a single user or multiuser communication session. As another example, geometry data store 460 may store characteristics of a physical environment, which may affect how a user is able to move around or interact with the physical environment around the device. Storage 430 may further include, for example, graphical information data store 480. Graphical information data store 480 may store characteristics of graphical information (e.g., depth information and/or color information) that may be composited and rendered in an image frame containing a representation of all or part of the user's physical environment. Additionally, or alternatively, geometry data and graphical information data may be stored across network 405, such as by global geometry/graphical information data store 420.

According to one or more embodiments, memory 435 may include one or more modules that comprise computer readable code executable by the processor(s) 425 to perform functions. The memory may include, for example, an XR module 465, which may be used to process information in an XR environment. The XR environment may be a computing environment which supports a single user experience by electronic device 400, as well as a shared, multiuser experience, e.g., involving collaboration with an additional electronic device(s) 410.

The memory 435 may also include a geometry module 470, for processing information regarding the characteristics of a physical environment, which may affect how a user moves around the environment or interacts with physical and/or virtual objects within the environment. The geometry module 470 may determine geometric characteristics of a physical environment, for example from sensor data collected by sensor(s) 445, or from pre-stored information, such as from geometry data store 460. Applications 475 may include, for example, computer applications that may be experienced in an XR environment by one or multiple devices, such as electronic device 400 and additional electronic device(s) 410. The graphics module 485 may be used, e.g., for processing information regarding characteristics of graphical information, including depth and/or color information, which may or may not be composited into an image frame depicting all or part of a user's physical environment)

Although electronic device 400 is depicted as comprising the numerous components described above, in one or more embodiments, the various components may be distributed across multiple devices. Accordingly, although certain processes are described herein, with respect to the particular systems as depicted, in one or more embodiments, the various processes may be performed differently, based on the differently-distributed functionality. Further, additional components may be used, some combination of the functionality of any of the components may be combined.

Exemplary Electronic Devices

Figure 5A:
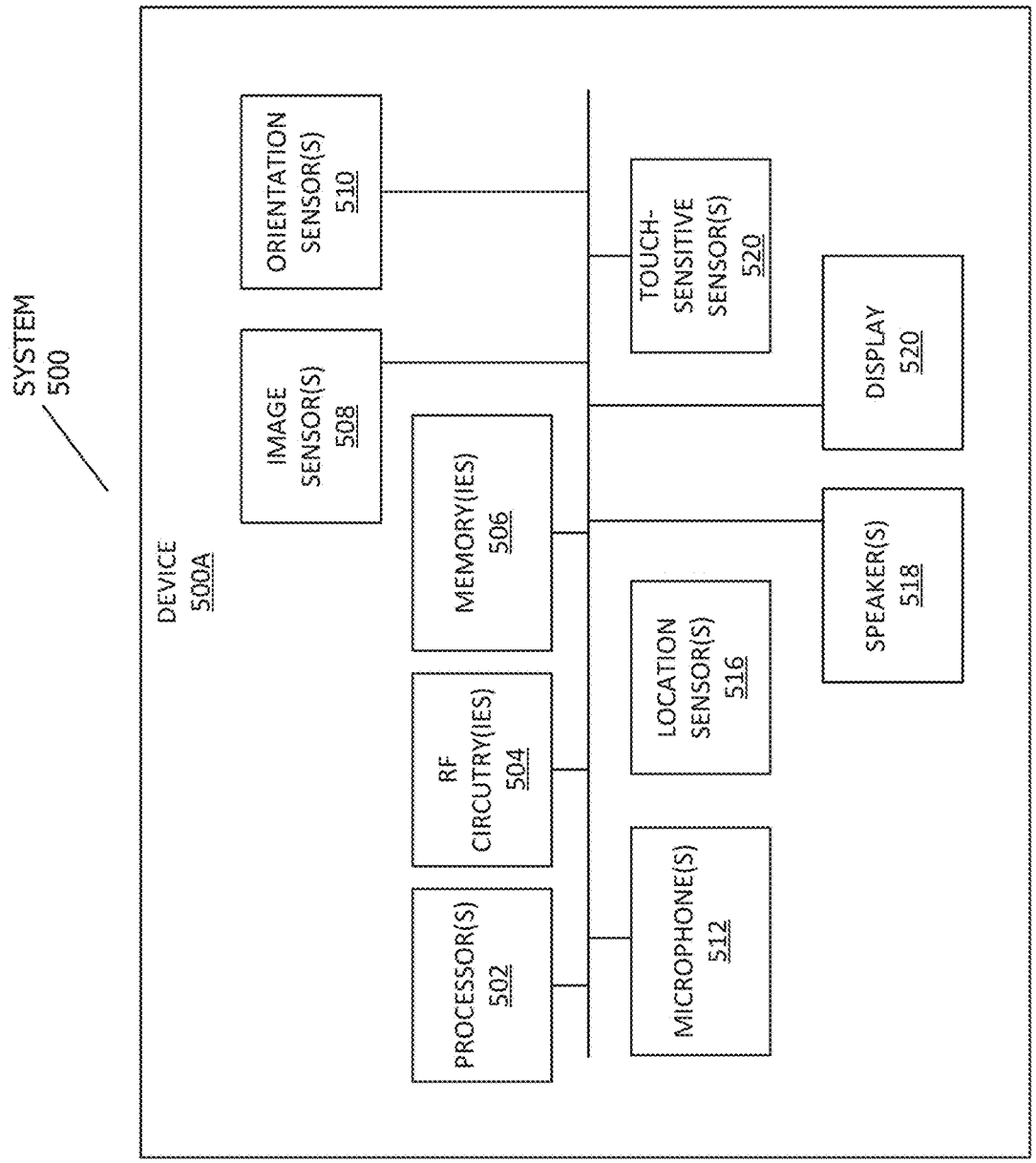
FIGS. 5A-5B show exemplary systems for use in various computer-simulated XR technologies.
Figure 5B:
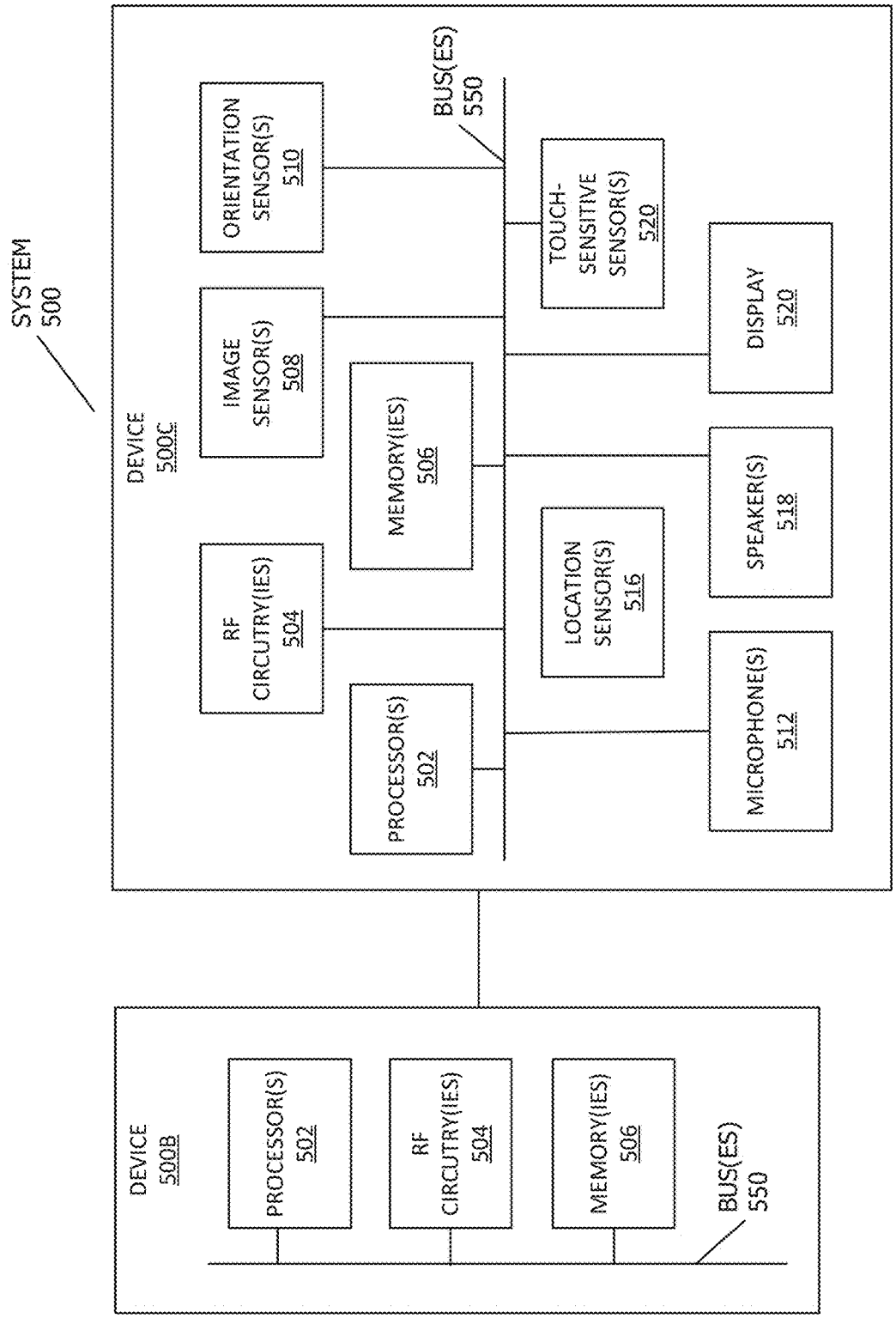

FIG. 5A and FIG. 5B depict exemplary system 500 for use in various extended reality (XR) technologies. In some examples, as illustrated in FIG. 5A, system 500 includes device 500A. Device 500A includes various components, such as processor(s) 502, RF circuitry (ies) 504, memory (ies) 506, image sensor(s) 508, orientation sensor(s) 510, microphone(s) 512, location sensor(s) 516, speaker(s) 518, display(s) 520, and touch-sensitive sensor(s) 522. These components optionally communicate over communication bus(es) 550 of device 500a.

In some examples, elements of system 500 are implemented in a base station device (e.g., a computing device, such as a remote server, mobile device, or laptop) and other elements of system 500 are implemented in a second device (e.g., a head-mounted device). In some examples, device 500A is implemented in a base station device or a second device.

As illustrated in FIG. 5B, in some examples, system 500 includes two (or more) devices in communication, such as through a wired connection or a wireless connection. First device 500B (e.g., a base station device) includes processor(s) 502, RF circuitry (ies) 504, and memory (ies) 506. These components optionally communicate over communication bus(es) 550 of device 500C. Second device 500C (e.g., a head-mounted device) includes various components, such as processor(s) 502, RF circuitry (ies) 504, memory (ies) 506, image sensor(s) 508, orientation sensor(s) 510, microphone(s) 512, location sensor(s) 516, speaker(s) 518, display(s) 520, and touch-sensitive sensor(s) 522. These components optionally communicate over communication bus(es) 550 of device 500C.

System 500 includes processor(s) 502 and memory (ies) 506. Processor(s) 502 include one or more general processors, one or more graphics processors, and/or one or more digital signal processors. In some examples, memory (ies) 506 are one or more non-transitory computer-readable storage mediums (e.g., flash memory, random access memory) that store computer-readable instructions configured to be executed by processor(s) 502 to perform the techniques described below.

System 500 includes RF circuitry (ies) 504. RF circuitry (ies) 504 optionally include circuitry for communicating with electronic devices, networks, such as the Internet, intranets, and/or a wireless network, such as cellular networks and wireless local area networks (LANs). RF circuitry (ies) 504 optionally includes circuitry for communicating using near-field communication and/or short-range communication, such as Bluetooth®.

System 500 includes display(s) 520. Display(s) 520 may have an opaque display. Display(s) 520 may have a transparent or semi-transparent display that may incorporate a substrate through which light representative of images is directed to an individual's eyes. Display(s) 520 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 520 include heads up displays, automotive windshields with the ability to display graphics, windows with the ability to display graphics, lenses with the ability to display graphics, tablets, smartphones, and desktop or laptop computers. Alternatively, system 500 may be designed to receive an external display (e.g., a smartphone). In some examples, system 500 is a projection-based system that uses retinal projection to project images onto an individual's retina or projects virtual objects into a physical setting (e.g., onto a physical surface or as a holograph).

In some examples, system 500 includes touch-sensitive sensor(s) 522 for receiving user inputs, such as tap inputs and swipe inputs. In some examples, display(s) 520 and touch-sensitive sensor(s) 522 form touch-sensitive display(s).

System 500 includes image sensor(s) 508. Image sensors(s) 508 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 508 also optionally include one or more event camera(s) configured to capture movement of physical elements in the physical setting. Image sensor(s) 508 also optionally include one or more depth sensor(s) configured to detect the distance of physical elements from system 500. In some examples, system 500 uses CCD sensors, event cameras, and depth sensors in combination to detect the physical setting around system 500. In some examples, image sensor(s) 508 include a first image sensor and a second image sensor. The first image sensor and the second image sensor are optionally configured to capture images of physical elements in the physical setting from two distinct perspectives. In some examples, system 500 uses image sensor(s) 508 to receive user inputs, such as hand gestures. In some examples, system 500 uses image sensor(s) 508 to detect the position and orientation of system 500 and/or display(s) 520 in the physical setting. For example, system 500 uses image sensor(s) 508 to track the position and orientation of display(s) 520 relative to one or more fixed elements in the physical setting.

In some examples, system 500 includes microphones(s) 512. System 500 uses microphone(s) 512 to detect sound from the user and/or the physical setting of the user. In some examples, microphone(s) 512 includes an array of microphones (including a plurality of microphones) that optionally operate in tandem, such as to identify ambient noise or to locate the source of sound in space of the physical setting.

System 500 includes orientation sensor(s) 510 for detecting orientation and/or movement of system 500 and/or display(s) 520. For example, system 500 uses orientation sensor(s) 510 to track changes in the position and/or orientation of system 500 and/or display(s) 520, such as with respect to physical elements in the physical setting. Orientation sensor(s) 510 optionally include one or more gyroscopes and/or one or more accelerometers.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2-3 or the arrangement of elements shown in FIGS. 1, 4, and 5 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A selective graphical composition method, comprising:
   obtaining, at a first device, graphical information for a first image frame, wherein the graphical information comprises at least depth information and color information for at least a portion of pixels within the first image frame;
   determining a regional depth value for a region of pixels in the first image frame based, at least in part, on the depth information for the pixels within the region of pixels;
   coding the region of pixels as either a skipped region or a non-skipped region based, at least in part, on the determined regional depth value for the region of pixels and a determination of whether color information for any of the pixels within the region of pixels contains a non-default value;
   if the region of pixels is coded as a non-skipped region, compositing a representation of the region of pixels into the first image frame; and
   if the region of pixels is coded as a skipped region, avoid compositing a representation of the region of pixels into the first image frame.

2. The method of claim 1, further comprising:
   dividing the portion of pixels within the first image frame into a first plurality of regions of pixels,
   wherein determining a regional depth value for a region of pixels in the first image frame further comprises determining a regional depth value for each region of pixels in the first plurality of regions of pixels, and wherein coding the region of pixels further comprises coding each region of the first plurality of regions of pixels as either a skipped region or a non-skipped region based, at least in part, on the determined regional depth value for the respective region of pixels.

3. The method of claim 2,
   wherein compositing a representation of the region of pixels into the first image frame if the region of pixels is coded as a non-skipped region further comprises: compositing a representation of the non-skipped regions of the first plurality of regions into the first image frame; and
   wherein avoiding compositing a representation of the region of pixels into the first image frame if the region of pixels is coded as a skipped region further comprises: avoiding compositing a representation of the skipped regions of the first plurality of regions into the first image frame.

4. The method of claim 1, wherein determining a regional depth value for the region of pixels in the first image frame further comprises determining at least one of: a maximum depth of a pixel within the region of pixels; a minimum depth of a pixel within the region of pixels; or an average depth for the pixels within the region of pixels.

5. The method of claim 1, wherein the graphical information further comprises alpha channel information.

6. The method of claim 5, wherein coding the region of pixels as either a skipped region or a non-skipped region is further based, at least in part, on a determination of whether the alpha channel information for any of the pixels within the region contains a non-default value.

7. The method of claim 2, wherein determining a regional depth value for each region of the first plurality of regions of pixels further comprises:
   setting the regional depth value for a respective region of the first plurality of regions to a value of '0' if all pixels within the respective region have depth information indicative of a depth greater than or equal to a predetermined depth rendering threshold; and setting the regional depth value for a respective region of the first plurality of regions to a value of '1' if any pixels within the respective region have depth information indicative of a depth less than the predetermined depth rendering threshold.

8. The method of claim 7, wherein coding each region of the first plurality of regions of pixels as either a skipped region or a non-skipped region based, at least in part, on the determined regional depth value for the respective region further comprises:
coding a respective region of the first plurality of regions as a skipped region if the respective region has a regional depth value of '0'; and
coding a respective region of the first plurality of regions as a non-skipped region if the respective region has a regional depth value of '1'.

9. The method of claim 3, wherein performing the steps of: determining a regional depth value for each region of the first plurality of regions of pixels; and coding each region of the first plurality of regions of pixels as either a skipped region or a non-skipped region based, at least in part, on the determined regional depth value for the respective region further comprises:
dispatching an individual compute thread for each region of the first plurality of regions in parallel to perform the steps of:
determining a regional depth value for a respective region of the first plurality of regions of pixels; and
coding the respective region of the first plurality of regions of pixels as either a skipped region or a non-skipped region based, at least in part, on the determined regional depth value for the respective region.

10. A non-transitory computer readable medium comprising computer readable code executable by one of more processors to:
obtain, at a first device, graphical information for a first image frame, wherein the graphical information comprises at least depth information and color information for at least a portion of pixels within the first image frame;
determine a regional depth value for a region of pixels in the first image frame;
code the region of pixels as either a skipped region or a non-skipped region based, at least in part, on the determined regional depth value for the region of pixels and a determination of whether color information for any of the pixels within the region of pixels contains a non-default value;
if the region of pixels is coded as a non-skipped region, composite a representation of the region of pixels into the first image frame; and
if the region of pixels is coded as a skipped region, avoid compositing a representation of the region of pixels into the first image frame.

11. The non-transitory computer readable medium of claim 10, further comprising computer readable code executable by one of the one or more processors to:
divide the portion of pixels within the first image frame into a first plurality of regions of pixels,
wherein the computer readable code to determine a regional depth value for a region of pixels in the first image frame further comprises computer readable code to determine a regional depth value for each region of pixels in the first plurality of regions of pixels, and
wherein the computer readable code to code the region of pixels further comprises computer readable code to code each region of the first plurality of regions of pixels as either a skipped region or a non-skipped region based, at least in part, on the determined regional depth value for the respective region of pixels.

12. The non-transitory computer readable medium of claim 11,
wherein the computer readable code to composite a representation of the region of pixels into the first image frame if the region of pixels is coded as a non-skipped region further comprises computer readable code to: composite a representation of the non-skipped regions of the first plurality of regions into the first image frame; and
wherein the computer readable code to avoid compositing a representation of the region of pixels into the first image frame if the region of pixels is coded as a skipped region further comprises computer readable code to: avoid compositing a representation of the skipped regions of the first plurality of regions into the first image frame.

13. The non-transitory computer readable medium of claim 10, wherein the computer readable code to determine a regional depth value for the region of pixels in the first image frame further comprises computer readable code to determine at least one of: a maximum depth of a pixel within the pixels within the region; a minimum depth of a pixel within the pixels within the region; or an average depth for the pixels within the region.

14. The non-transitory computer readable medium of claim 11, wherein the computer readable code to determine a regional depth value for each region of the first plurality of regions of pixels further comprises:
computer readable code to set the regional depth value for a respective region of the first plurality of regions to a value of '0' if all pixels within the respective region have depth information indicative of a depth greater than or equal to a predetermined depth rendering threshold; and
computer readable code to set the regional depth value for a respective region of the first plurality of regions to a value of '1' if any pixels within the respective region have depth information indicative of a depth less than the predetermined depth rendering threshold.

15. The non-transitory computer readable medium of claim 14, wherein the computer readable code to code each region of the first plurality of regions of pixels as either a skipped region or a non-skipped region based, at least in part, on the determined regional depth value for the respective region further comprises:
computer readable code to code a respective region of the first plurality of regions as a skipped region if the respective region has a regional depth value of '0'; and
computer readable code to code a respective region of the first plurality of regions as a non-skipped region if the respective region has a regional depth value of '1'.

16. The non-transitory computer readable medium of claim 12, wherein the computer readable code to: determine a regional depth value for each region of the first plurality of regions of pixels; and code each region of the first plurality of regions of pixels as either a skipped region or a non-skipped region based, at least in part, on the determined regional depth value for the respective region further comprises computer readable code to:
dispatch an individual compute thread for each region of the first plurality of regions in parallel to:
determine a regional depth value for a respective region of the first plurality of regions of pixels; and code the respective region of the first plurality of regions of pixels as either a skipped region or a non-skipped region based, at least in part, on the determined regional depth value for the respective region.

17. A system, comprising:
a display;
one or more processors; and
one or more non-transitory computer readable media comprising computer readable code executable by the one of more processors to:
   obtain, at a first processor of the one or more processors, graphical information for a first image frame, wherein the graphical information comprises at least depth information and color information for at least a portion of pixels within the first image frame;
   determine a regional depth value for a region pixels in the first image frame;
   code the region of pixels as either a skipped region or a non-skipped region based, at least in part, on the determined regional depth value for the region of pixels and a determination of whether color information for any of the pixels within the region of pixels contains a non-default value;
   if the region of pixels is a non-skipped region, composite a representation of the region of pixels into the first image frame; and
   if the region of pixels is a skipped region, avoid compositing a representation of the region of pixels into the first image frame.

18. The system of claim 17, further comprising computer readable code executable by one of the one or more processors to:
   divide the portion of pixels within the first image frame into a first plurality of regions of pixels,
   wherein the computer readable code to determine a regional depth value for a region of pixels in the first image frame further comprises computer readable code to determine a regional depth value for each region of pixels in the first plurality of regions of pixels, and
   wherein the computer readable code to code the region of pixels further comprises computer readable code to code each region of the first plurality of regions of pixels as either a skipped region or a non-skipped region based, at least in part, on the determined regional depth value for the respective region of pixels.

19. The system of claim 18,
   wherein the computer readable code to composite a representation of the region of pixels into the first image frame if the region of pixels is coded as a non-skipped region further comprises computer readable code to: composite a representation of the non-skipped regions of the first plurality of regions into the first image frame; and
   wherein the computer readable code to avoid compositing a representation of the region of pixels into the first image frame if the region of pixels is coded as a skipped region further comprises computer readable code to: avoid compositing a representation of the skipped regions of the first plurality of regions into the first image frame.

20. The system of claim 17, wherein the computer readable code to determine a regional depth value for the region of pixels in the first image frame further comprises computer readable code to determine at least one of: a maximum depth value of a pixel within the region; a minimum depth value of a pixel within the region; or an average depth for the pixels in the region.

* * * * *